Nov. 8, 1927.

A. MANNICK

AEROPLANE

Filed Feb. 4, 1927

Inventor
Androw Mannick.

By Bryant & Lowry
Attorneys

Nov. 8, 1927.

A. MANNICK

AEROPLANE

Filed Feb. 4, 1927

Inventor
Andrew Mannick.

by Bryant & Lowry
Attorneys

Nov. 8, 1927. 1,648,818
A. MANNICK
AEROPLANE
Filed Feb. 4, 1927 6 Sheets-Sheet 4

Inventor
Andrew Mannick.
by Bryant & Lowry
Attorneys

Nov. 8, 1927.

A. MANNICK

AEROPLANE

Filed Feb. 4, 1927

Inventor
Andrew Mannick
by Bryant & Lavy
Attorneys

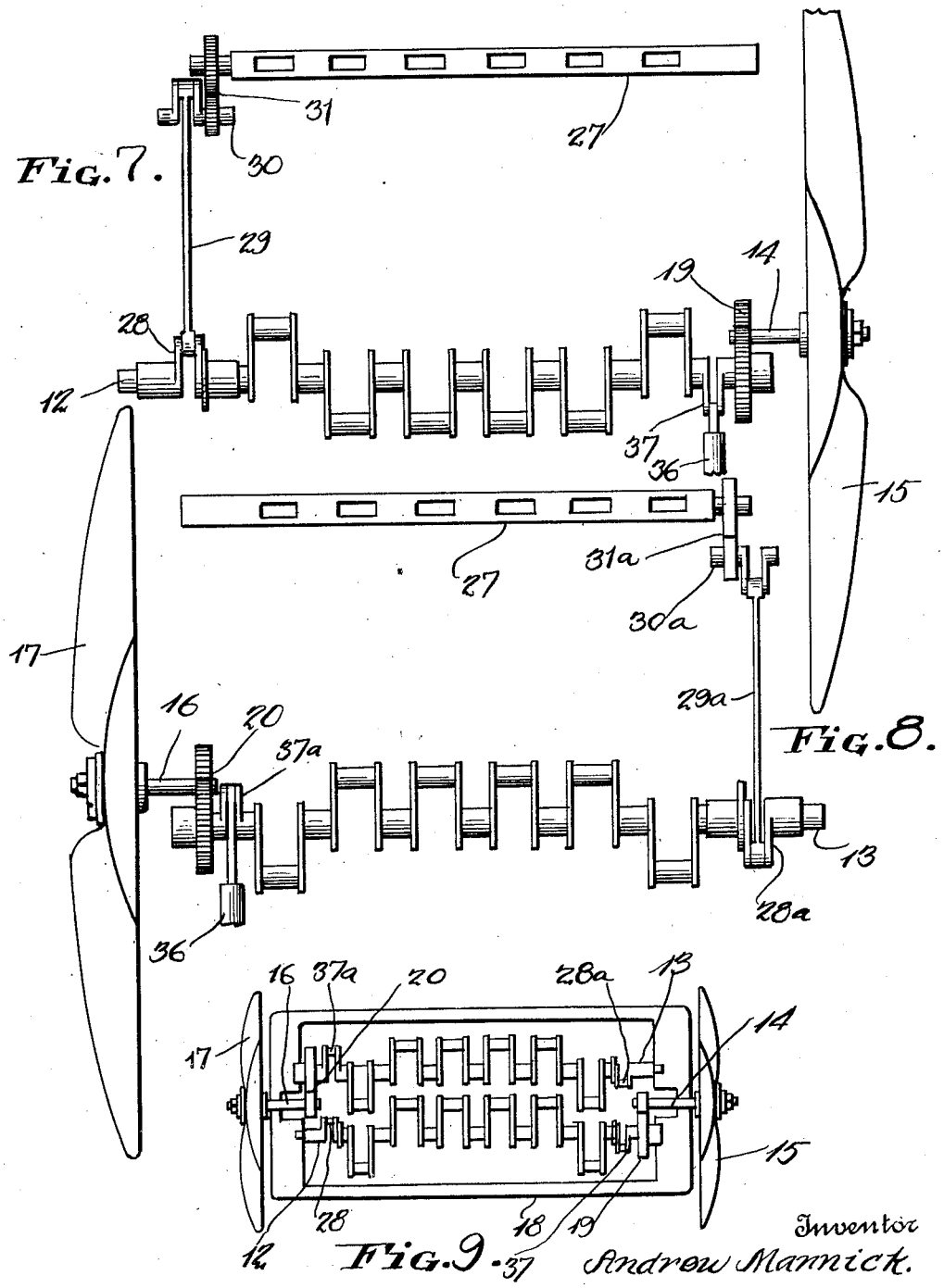

Patented Nov. 8, 1927.

1,648,818

UNITED STATES PATENT OFFICE.

ANDROW MANNICK, OF BRADDOCK, PENNSYLVANIA.

AEROPLANE.

Application filed February 4, 1927. Serial No. 165,836.

This invention relates to certain new and useful improvements in aeroplanes, and has more particular reference to improved propulsion mechanism for aeroplanes.

The primary object of the invention is to provide an aeroplane of simplified and improved construction and embodying propelling means of a simple and compact nature and so constituted as to enable the pilot to effect a safe landing under certain adverse conditions.

A more specific object of the invention is to provide an aeroplane of improved form having two propellers arranged in a novel desirable manner and independently driven so that, in case either propeller or its driving means should become damaged or defective in operation, the other propeller and its driving means may be relied upon to effect a safe landing of the aeroplane.

Still another object of the invention is to provide an aeroplane and propelling mechanism of the above kind wherein the propeller driving mechanism is of a simple and compact nature embodying a single engine or motor capable of use where economy of space is essential and involving two sets of cylinders with a crank shaft for each set, one propeller being operatively connected to each crank shaft, whereby the disabling of either propeller or its actuating portion of the engine, will leave the remaining propeller and its actuating portion of the engine operative to enable a safe landing.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view of one form of aeroplane constructed in accordance with the present invention;

Figure 6 is a diagrammatic view illustrating the manner of operatively connecting the intake and exhaust controlling valves of each set of cylinders with the associated crank shaft;

Figure 7 is a detail elevational view of one of the crank shafts and the propeller operatively connected thereto together with an associated exhaust and intake controlling valve and an oil pump with their operative connections with the crank shaft;

Figure 8 is a view similar to Figure 7 showing the other crank shaft and similar parts associated therewith; and Figure 9 is a plan view of the lower section of the crank case of the engine shown in Figures 3 to 5 inclusive, together with the associated crank shafts and propellers.

Figure 1:
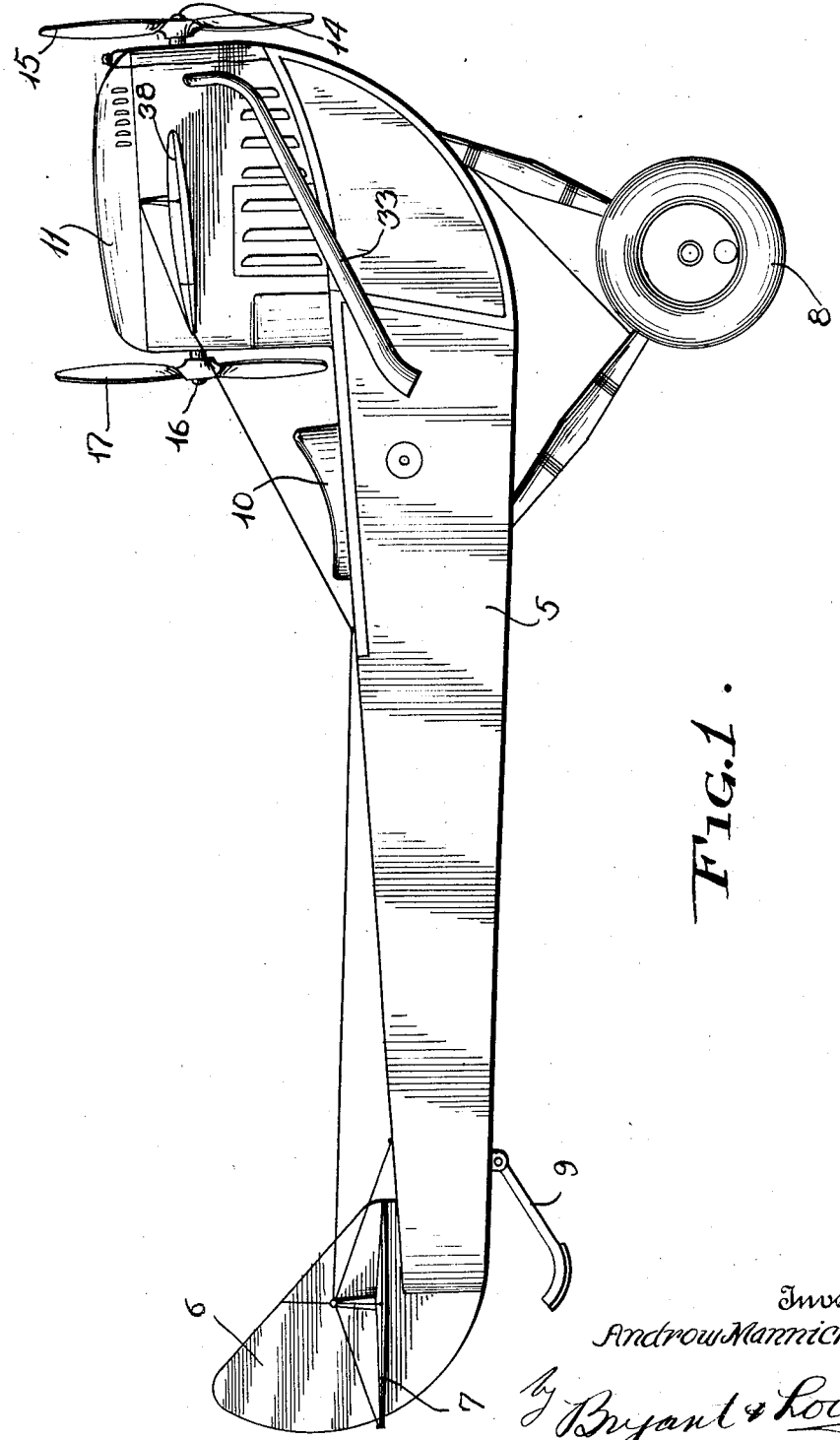

Referring more in detail to the drawings, the aeroplane illustrated as embodying the present invention includes an elongated body or fuselage 5 having the usual vertical and horizontal rudders 6 and 7, respectively, at the rear end thereof, and equipped with the usual forward wheeled landing gear 8, and rear tail skid 9.

In accordance with the present invention, the fuselage 5 is provided at its forward end, in front of the pilot's seat 10, with an upward extension in the form of a hollow casing or hood 11 within which is housed an engine of novel and special construction provided with a pair of spaced parallel crank shafts 12 and 13, each adapted to be independently actuated in a manner which will presently become apparent, the crank shaft 12 being operatively connected to a forwardly projecting countershaft 14 carrying a propeller 15 at the forward end of the housing 11, and the crank shaft 13 being operatively connected to a rearwardly projecting shaft 16 carrying a propeller 17 at the rear end of the extension or housing 11. It is thus apparent that by proper actuation of the propellers 15 and 17, both of said propellers may be utilized to induce the forward travel of the aeroplane, or either of them may be so employed when desired or found necessary.

Figure 2:
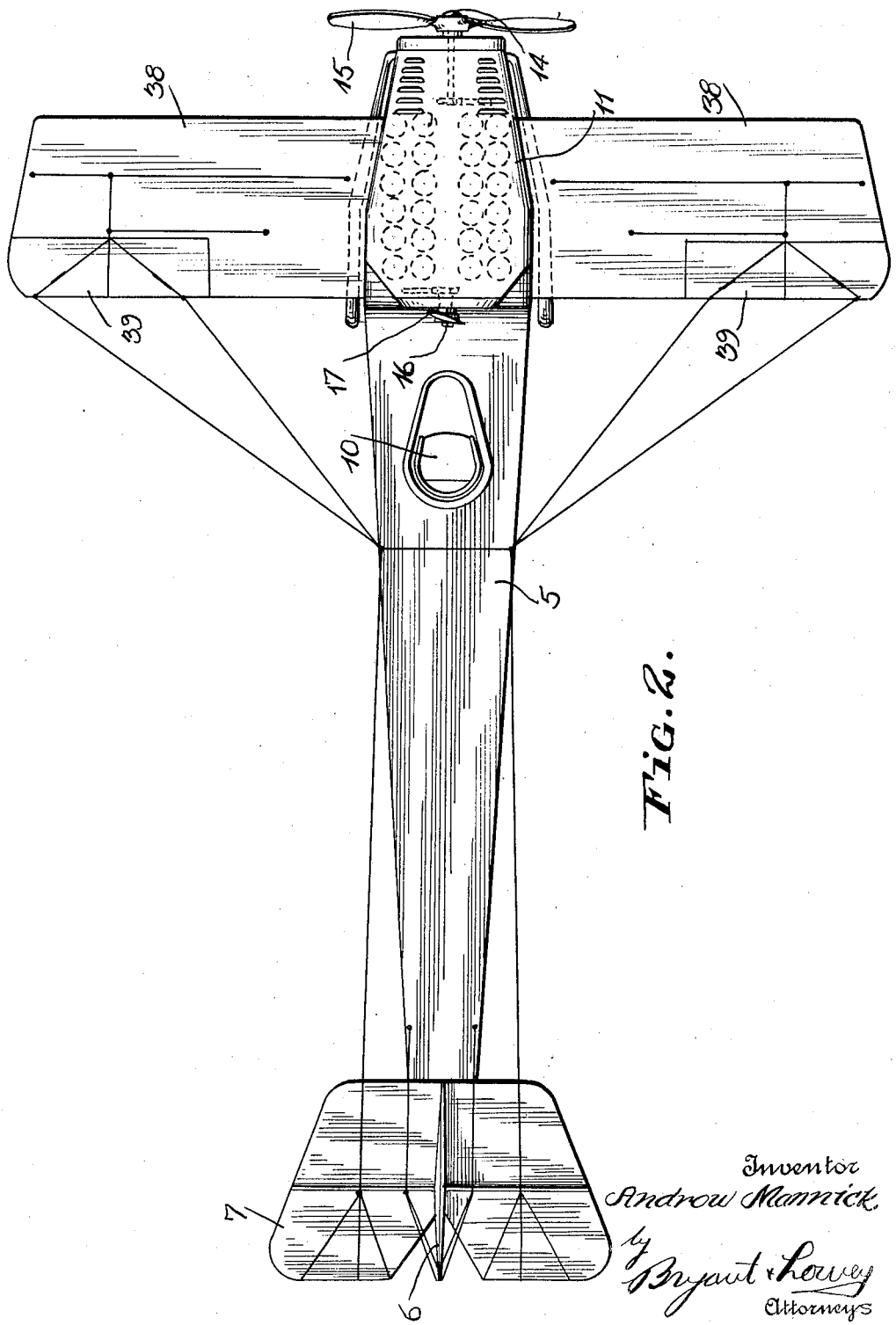
Figure 2 is a top plan view thereof.
Figure 3:
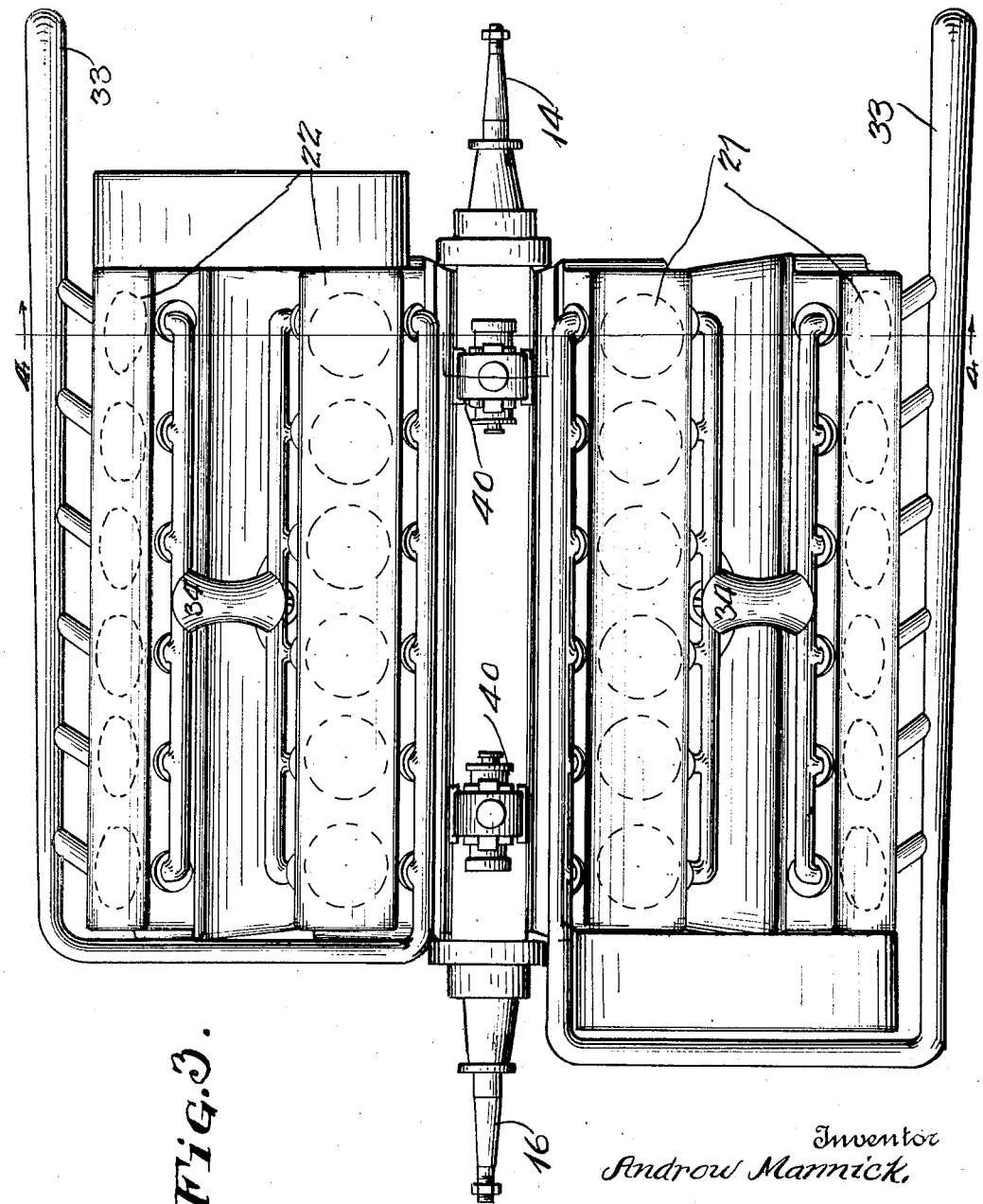
Figure 3 is a top plan view of the engine employed for independently actuating the propellers of the aeroplane shown in Figures 1 and 2.
Figure 4:
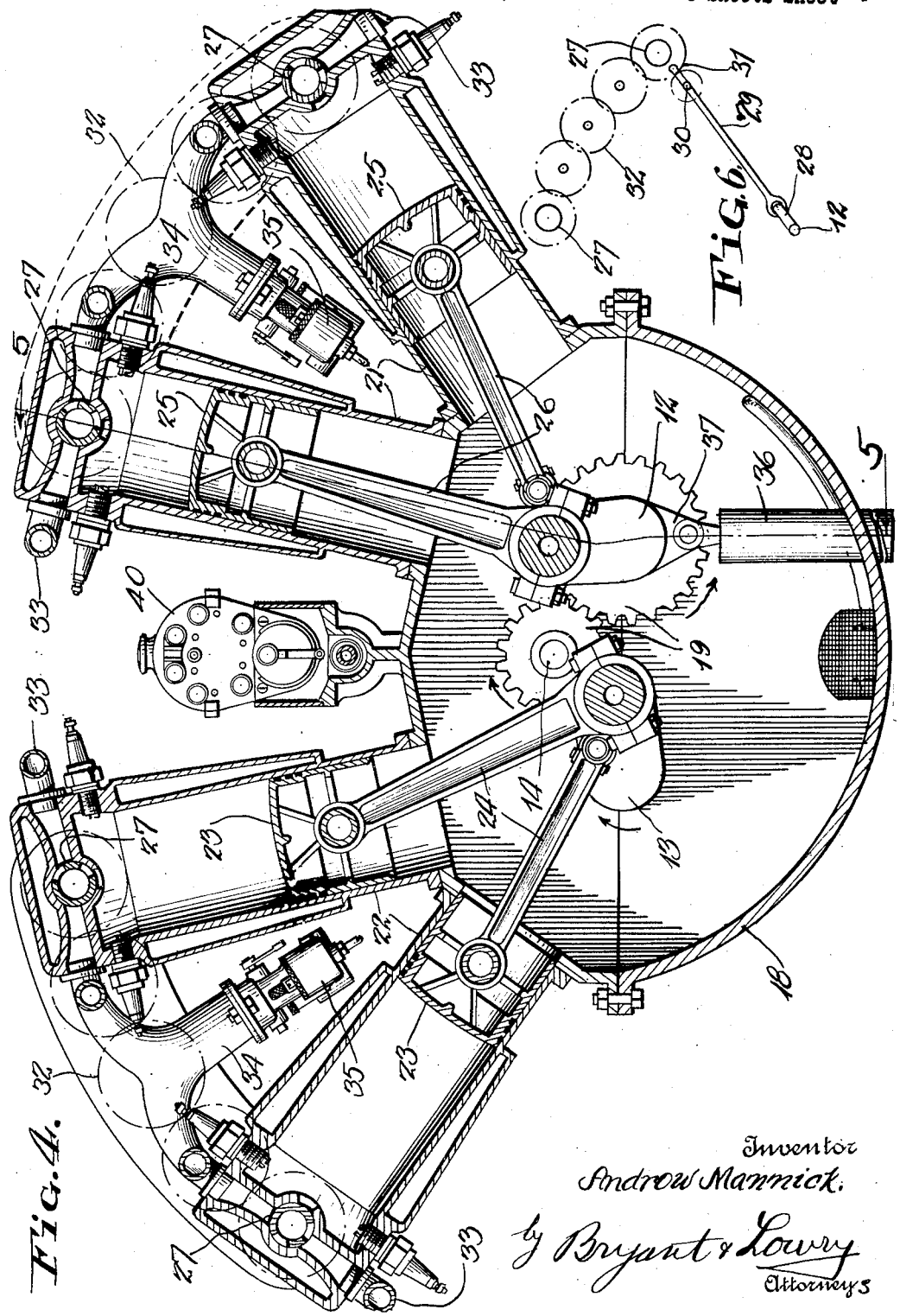
Figure 4 is a transverse section taken substantially upon line 4—4 of Figure 3.
Figure 5:
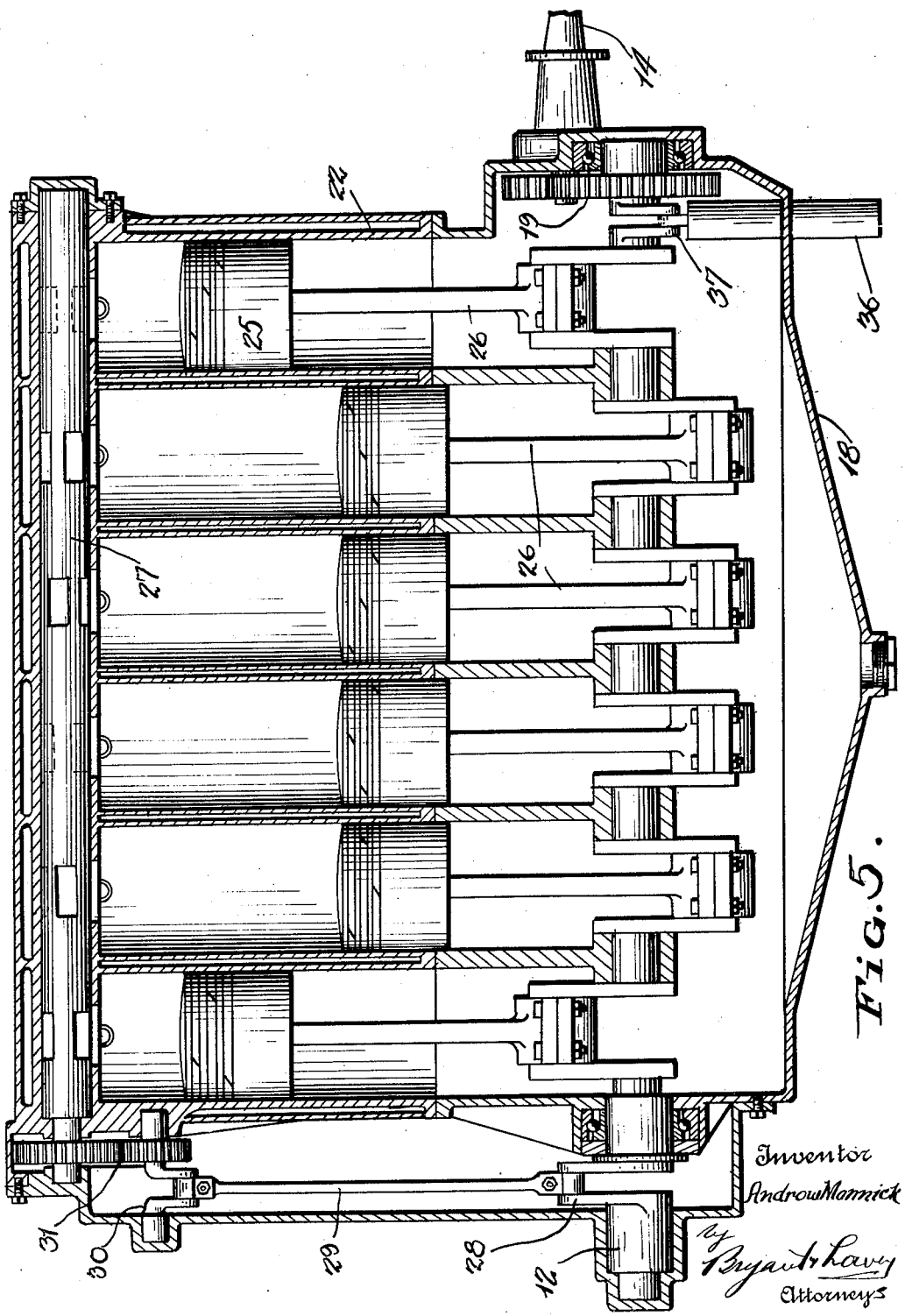
Figure 5 is a longitudinal section taken substantially upon line 5—5 of Figure 4.

The engine for operating the propellers 15 and 17 includes a single or common crank case 18 in which the crank shafts 12 and 13 are journaled as shown in Figures 4, 5 and 9, the shafts 14 and 16 being journaled in and projecting through the ends of the crank case centrally between the sides of the latter and in longitudinally aligned relation. As shown more clearly in Figure 9, the inner end of the shaft 14 is operatively connected to the adjacent forward end of crank shaft 12 by means of a spur gearing 19, while the inner end of the shaft 14 is similarly operatively connected to the adjacent rear end of crank shaft 13 by a spur gearing 20. Thus, with the engine mounted centrally within the housing 11, the shafts 14 and 16 carrying the propellers will be located coincident with the longitudinal axis of the aeroplane as illustrated in Figure 2. The engine is preferably of the general form known as a "V-type" engine embodying upwardly diverging sets of cylinders, and in accordance with the present invention, the cylinders of each set are arranged in two longitudinal rows, the cylinders of one set being denoted at 21 and located at one side of the vertical longitudinal axis of the crank case, and the cylinders of the other set being indicated at 22 and located at the other side of said vertical longitudinal axis. Working in the cylinders 21 are pistons 23 having piston rods or pitmen 24 operatively connected with the cranks of crank shaft 13, and working in the cylinders 22 are pistons 25 having piston rods or pitmen 26 operatively connected with the cranks of crank shaft 12. From the above it will be apparent that upon supplying explosive charges to the cylinders of the respective sets at the proper time and causing explosion of said charges in proper sequence, the reciprocation of the pistons 23 may be effected for causing actuation or rotation of crank shaft 13 for turning the propeller 17, while a similar supply and ignition of explosive charges to and within the cylinders 22 will cause movement of pistons 25 for actuating or turning crankshaft 12 and causing rotation of propeller 15. In the embodiment illustrated, the propeller 17 is formed reversely to propeller 15 due to the fact that crank shaft 13 is adapted to rotate in a direction opposite to that of crank shaft 12, as indicated by the arrows in Figure 4, thus insuring that both propellers will act to cause the forward travel of the aeroplane.

As the manner of supplying and controlling explosive charges and exhaust of spent gases may be accomplished with respect to the several cylinders in any preferred or well known manner, detailed description thereof will be refrained from, the same forming no specific part of the present invention. However, it is contemplated that the supply and exhaust with respect to each row of cylinders be controlled through the use of a conventional form of rotary cylindrical valve 27 common to and journaled in the heads of the cylinders of each row. With such a construction, the valve 27 for one row of cylinders of each set may be operatively connected with the associated crank shaft 12 or 13, and a gearing may be provided between the valve of said row and the valve of the other row of the same set. In other words, the crank shaft 12 may be provided with an additional crank at one end as at 28 operatively connected by a pitman 29 with the crank of a counter-shaft 30 journaled in a housing at the rear end of one of the rows of cylinders 21, the crank shaft 30 being operatively connected with the rear end of the adjacent valve 27 by means of a spur gearing 31 as shown clearly in Figures 5, and 7. In a like manner, the forward end of crank shaft 13 may be provided with an additional crank 28$^a$ operatively connected by a pitman 29$^a$ with the crank of a counter-shaft 30$^a$ journaled within a housing at the forward end of one of the rows of cylinders 22 of the other set, the shaft 30$^a$ being operatively connected with the adjacent forward end of the associated valve 27 by means of a spur gearing 31$^a$. In this way, the valve for one row of cylinders of each set is operatively connected with the valve of the other row of the same set by means of a train of spur gearing indicated generally in Figures 4 and 6 at 32. The exhausts of the cylinders of each set may communicate with a separate manifold 33, and a supply or intake manifold is provided for and between the rows of each set as at 34, each intake manifold having a separate carburetor 35 associated therewith. It will of course be understood that a separate ignition system will be provided for each set of cylinders so that trouble in the ignition system of either set of cylinders will not cause a defect in the operation of the other set of cylinders. In a like manner, a separate pump 36 is provided for the supply of lubricant to the working parts of each set of cylinders, one pump 36 being operatively connected with a second supplemental crank 37 provided near the forward end of crank shaft 12, and the other pump 36 being similarly connected to a similar supplemental crank 37$^a$ of the crank shaft 13 provided near the rear end of the latter.

In operation, the engine will ordinarily be operated for causing actuation of both crank shafts and both propellers so that the latter will cooperate to cause forward travel of the aeroplane at the required speed. However, in hovering, either propeller may be rendered inoperative so that the other propeller will give the desired sustaining effect to the aeroplane, and should either set of cylinders become inoperative or damaged for any reason, the other set may cause the operation of the associated propeller for insuring a safe landing in this emergency. This will be clearly evident in view of the fact that the sets of cylinders are separately operable and actuate independent crank shafts, each of which has a propeller operatively associated therewith.

In the form of the invention shown, the aeroplane is of the monoplane type having a single pair of oppositely projecting lateral aligned planes or wings 38 which may be equipped with ailerons 39 adapted to be suitably controlled from the driver's seat 10. However, it is readily apparent that the invention is not limited to this type of aeroplane, and it is only shown by way of example. Where magnetos are employed in the ignition systems, two of them, as indicated at 40, may be mounted upon the crank case between the sets of cylinders, one for each set.

From the foregoing description it will be seen that I have provided a simple and compact arrangement of propellers and means for independently operating them by the use of a single engine organization which may be employed conveniently where economy of space is essential or desirable. It will be further seen that the invention provides a practical manner of obtaining independent drive of a plurality of propellers whereby one of the same may be depended upon for enabling a safe landing in an emergency, providing the other propeller or its driving means should become damaged or inoperative from any cause.

Minor changes may be made without departing from the spirit and scope of the invention as claimed.

What I claim as new is:—

1. In an aeroplane, a fuselage having an upward extension at its forward end, driving means housed within said extension and having independently operable shafts respectively projecting through the front and rear of said extension, propellers fixed upon the projecting ends of said shaft for independent or simultaneous use in propelling the aeroplane forwardly, said driving means comprising an engine embodying a pair of crank shafts with an independently operable set of cylinders and actuating pistons for each, and operative connections between each of said first named shafts and the respective crankshafts.

2. In an aeroplane, a fuselage having an upward extension at its forward end, driving means housed within said extension and having independently operable shafts respectively projecting through the front and rear of said extensions, propellers fixed upon the projecting ends of said shafts for independent or simultaneous use in propelling the aeroplane forwardly, said driving means comprising an engine embodying a pair of crank shafts with an independently operable set of cylinders and actuating pistons for each, and operative connections between each of said first named shafts and the respective crankshafts, said engine further embodying a single crank case having the crank shafts journaled therein and carrying both sets of cylinders, said first named shafts being alined coincident with the longitudinal center plane of the engine and operatively connected to the crank shafts within the crank case.

3. In an aeroplane, a fuselage having an upward extension at its forward end, driving means housed within said extension and having independently operable shafts respectively projecting through the front and rear of said extension, and propellers fixed upon the projecting ends of said shafts for independent or simultaneous use in propelling the aeroplane forwardly, said driving means comprising an engine embodying a single crank case carrying two sets of cylinders and having a pair of independent crankshafts journaled therein, pistons in each set of cylinders, the pistons of one set being connected to one crankshaft and those of the other set being connected to the other crankshaft, independent fuel supply and exhaust controlling mechanism for each set of cylinders, and operative connections between the first named shafts and the respective crank shafts.

4. In an aeroplane, a fuselage having an upward extension at its forward end, driving means housed within said extension and having independently operable shafts respectively projecting through the front and rear of said extension, propellers fixed upon the projecting ends of said shafts for independent or simultaneous use in propelling the aeroplane forwardly, said driving means comprising an engine embodying a single crank case carrying two sets of cylinders and having a pair of independent crankshafts journaled therein, pistons in each set of cylinders, the pistons of one set being connected to one crankshaft and those of the other set being connected to the other crankshaft, independent fuel supply and exhaust controlling mechanism for each set of cylinders, operative connections between the first named shafts and the respective crank shafts, the cylinders of each each set being arranged in two rows, said supply and exhaust controlling mechanism embodying a rotary valve for each row of cylinders, an operative connection between each crank shaft and the valve of one row of cylinders of each set, and an operative connection between each of said valves and the other valve of the same set of cylinders.

5. In an aeroplane, a fuselage, an engine mounted in the fuselage and having longitudinally arranged independently operable crankshafts, and a propeller shaft operatively connected to each crankshaft, said propeller shaft being alined, and projecting at opposite ends of the engine.

In testimony whereof I affix my signature.

ANDROW MANNICK.